United States Patent
Oh et al.

(10) Patent No.: US 8,692,180 B2
(45) Date of Patent: Apr. 8, 2014

(54) READOUT CIRCUIT FOR TOUCH SENSOR

(75) Inventors: Seung-Seok Oh, Seoul (KR); Min-Ho Sohn, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 252 days.

(21) Appl. No.: 13/226,619

(22) Filed: Sep. 7, 2011

(65) Prior Publication Data
US 2012/0056663 A1    Mar. 8, 2012

(30) Foreign Application Priority Data
Sep. 7, 2010    (KR) .................. 10-2010-0087519

(51) Int. Cl.
*H01J 40/14* (2006.01)
*H03F 3/08* (2006.01)
*H01J 43/00* (2006.01)
*H03F 1/00* (2006.01)
*H03F 3/45* (2006.01)

(52) U.S. Cl.
USPC ............. 250/214 R; 250/214 A; 250/214 LA; 330/73; 330/254; 327/103

(58) Field of Classification Search
USPC ............. 250/214 R, 214 A, 214 LA, 214 LS, 250/214 AG, 214 C, 214 DC; 330/73, 254, 330/278, 295; 327/100–103
See application file for complete search history.

(56) References Cited

U.S. PATENT DOCUMENTS

2006/0114247 A1    6/2006  Brown
2008/0142281 A1*   6/2008  Geaghan .................... 178/18.06

FOREIGN PATENT DOCUMENTS

CN    1708672 A    12/2005

OTHER PUBLICATIONS

The First Office Action dated Dec. 2, 2013 from the State Intellectual Property Office of the People's Republic of China in counterpart Chinese application No. 201110271313.7.

* cited by examiner

*Primary Examiner* — Kevin Pyo
*Assistant Examiner* — Don Williams
(74) *Attorney, Agent, or Firm* — Morgan, Lewis & Bockius LLP

(57) ABSTRACT

The present invention relates to a readout circuit for a touch sensor which can increase touch sensing sensitivity regardless of a process variation and a driving voltage of the touch sensor.
The readout circuit includes a comparative circuit for setting an input range of a readout signal from the readout line as well as scaling the readout signal to be a required driving range and forwarding the readout signal scaled thus as a touch sensing signal, and an analog to digital converter for converting the touch sensing signal from the comparative circuit as a digital sensing signal and forwarding the digital sensing signal.

9 Claims, 8 Drawing Sheets

READOUT CIRCUIT FOR TOUCH SENSOR

CROSS REFERENCE TO RELATED APPLICATION

This application claims the benefit of the Patent Korean Application No. 10-2010-0087519, filed on Sep. 7, 2010, which is hereby incorporated by reference as if fully set forth herein.

BACKGROUND OF THE DISCLOSURE

1. Field of the Disclosure

The present invention relates to a readout circuit for a touch sensor, and more particularly to a readout circuit which can vary a sensing range of a sensing signal according to variation of a characteristic of a touch sensor.

2. Discussion of the Related Art

These days, a touch screen which enables to input information by touching a screen of various display devices is widely applied to a computer system as an information input device. Since the touch screen enables a user to move or select displayed information by simple touch of the screen with a finger or a stylus, everybody can use the touch screen, easily.

The touch screen provides touch information by sensing a touch and a touch position on the screen of the display device, and the computer system analyzes the touch information to carry out an order. As the display device, a flat display device, such as a liquid crystal display device, a plasma display panel, an organic luminescence diode display device, and the like are used, mostly.

Depending on sensing principles, in touch screen technologies, there are a resistance film type, a capacitive type, a photo type, an infrared rays type, an ultrasonic type, and an electromagnetic type. In general, the touch screen is fabricated as a panel attached to an upper side of the display device for performing a touch input function. However, since the display device having the touch panel attached thereto is required to fabricate a touch panel separate from the display device and attach to the display device, the display device having the touch panel attached thereto is involved in high production cost, increased thickness and weight of an entire system making mobility poor, and design limitations.

In order to solve those problems, recently, an in-cell touch sensor is developing, in which the touch sensor is built in the display device, such as the liquid crystal display device, or an organic luminescence diode display device. As the in-cell touch sensor, a photo-touch sensor which uses a photo-transistor to perceive the touch with light intensity, and a capacitive touch sensor which perceives the touch according to variation of capacitance, are used, mostly.

The photo-touch sensor perceives the touch with a photo-leakage current from the photo-transistor caused by an incident light or a reflected light by a touch body. The capacitive touch sensor perceives the touch with a change of the capacitance taking place when a small amount of charge moves to a touch point when a conductive body, such as a human body and a stylus, touches the touch sensor.

The readout circuit is provided with an amplifier for comparing a signal from the touch sensor to a reference voltage to generate a touch sensing signal which indicates whether the touch is made or not, and an analog to digital converter ADC for converting an analog signal from the amplifier into a digital sensing signal and forwarding the digital sensing signal to a signal processing unit.

In general, referring to FIG. 1, the ADC has an operative range of 1V with reference to the reference voltage Vref.

However, the in-cell touch sensor has a problem in that a base level varies according to process variation and a driving voltage when there is no touch as shown in FIG. 1. For an example, the base level varies with variations of resistance and parasitic capacitance caused by a position of the touch sensor, or, as shown in FIG. 1, the base level becomes the higher as the driving voltage of the touch sensor becomes the higher.

However, if the base level varies with the process variation and the driving voltage of the in-cell touch sensor, there has been a problem in that the sensing sensitivity becomes poor by failure of quantization of a overflowed portion taking place when a touch peak value of the touch exceeds a driving range (Vref~Vref+1V) of the ADC.

The problem of the poor touch sensing sensitivity can also take place at a touch panel attached to the display device by noise from the display device.

SUMMARY OF THE DISCLOSURE

Accordingly, the present invention is directed to a readout circuit.

An object of the present invention is to provide a readout circuit for a touch sensor which can increase touch sensing sensitivity regardless of a process variation and a driving voltage of the touch sensor.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a readout circuit connected to each of readout lines from a touch sensor includes a comparative circuit for setting an input range of a readout signal from the readout line as well as scaling the readout signal to be a required driving range and forwarding the readout signal scaled thus as a touch sensing signal, and an analog to digital converter for converting the touch sensing signal from the comparative circuit as a digital sensing signal and forwarding the digital sensing signal.

The comparative circuit includes first and second amplifiers connected to the readout line in series for limiting an input range of the readout signal to be between a first reference voltage and a second reference voltage, and the touch sensor having a first gain capacitor connected between input/output terminals of a first amplifier and a second gain capacitor connected between input/output terminals of a second amplifier, for scaling the readout signal to be a driving range of the analog to digital converter.

The first and second reference voltages are adjusted according to a voltage range of the readout signal, and capacitance of the first gain capacitor and capacitance of the second gain capacitor is adjusted according to the driving range of the analog to digital converter.

In another aspect of the present invention, a readout circuit connected to each of readout lines from a touch sensor, includes a plurality of comparative circuits for setting input ranges of a readout signal from the readout line different from one another as well as scaling the readout signal to be required driving ranges different from one another and forwarding the readout signals scaled thus as a plurality of touch sensing signals respectively, and a plurality of analog to digital converters for converting the touch sensing signals from the plurality of comparative circuits as digital sensing signals and forwarding the digital sensing signals, respectively.

The plurality of comparative circuits include first and second comparative circuits connected to the readout signal in common, and the plurality of analog to digital converters include first and second analog to digital converters connected to the first and second comparative circuits, respectively.

The first comparative circuit includes first and second amplifiers connected to the readout line in series for limiting an input range of the readout signal to be between a first reference voltage and a second reference voltage, and a first gain capacitor connected to input/output terminals of the first amplifier and a second gain capacitor connected between input/output terminals of the second amplifier to scale the readout signal to be a driving range of the first analog to digital converter.

The second comparative circuit includes third and fourth amplifiers connected to the readout line in series for limiting the input range of the readout signal to be between the second reference voltage and a third reference voltage, and a third gain capacitor connected to input/output terminals of the third amplifier and a fourth gain capacitor connected between input/output terminals of the fourth amplifier to scale the readout signal to be the driving range of the second analog to digital converter.

The first to third reference voltages are adjusted according to a voltage range of the readout signal individually, capacitance of the first gain capacitor and capacitance of the second gain capacitor is adjusted according to the driving range of the first analog to digital converter, and capacitance of the third gain capacitor and capacitance of the fourth gain capacitor is adjusted according to the driving range of the second analog to digital converter.

The readout circuit superimposes a plurality of touch sensing data forwarded through the plurality of analog to digital converters individually to forward one touch sensing data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
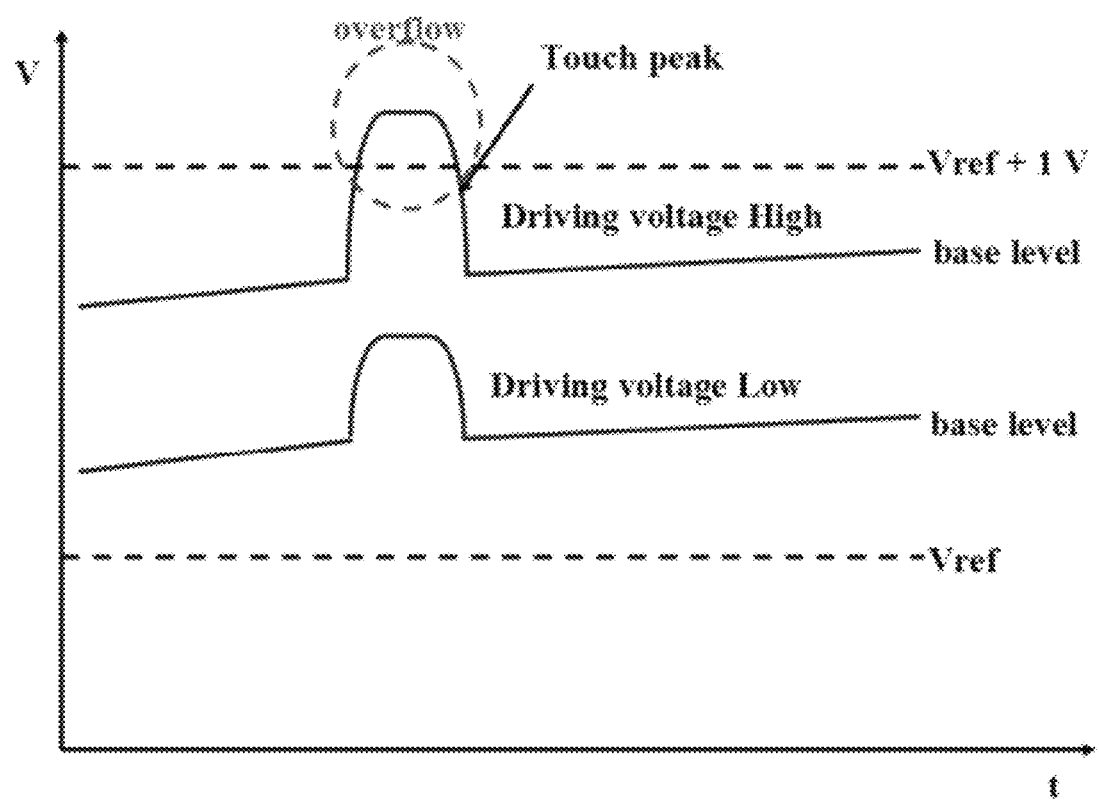
FIG. 1 illustrates a driving wave form of a related art readout circuit.
Figure 2:
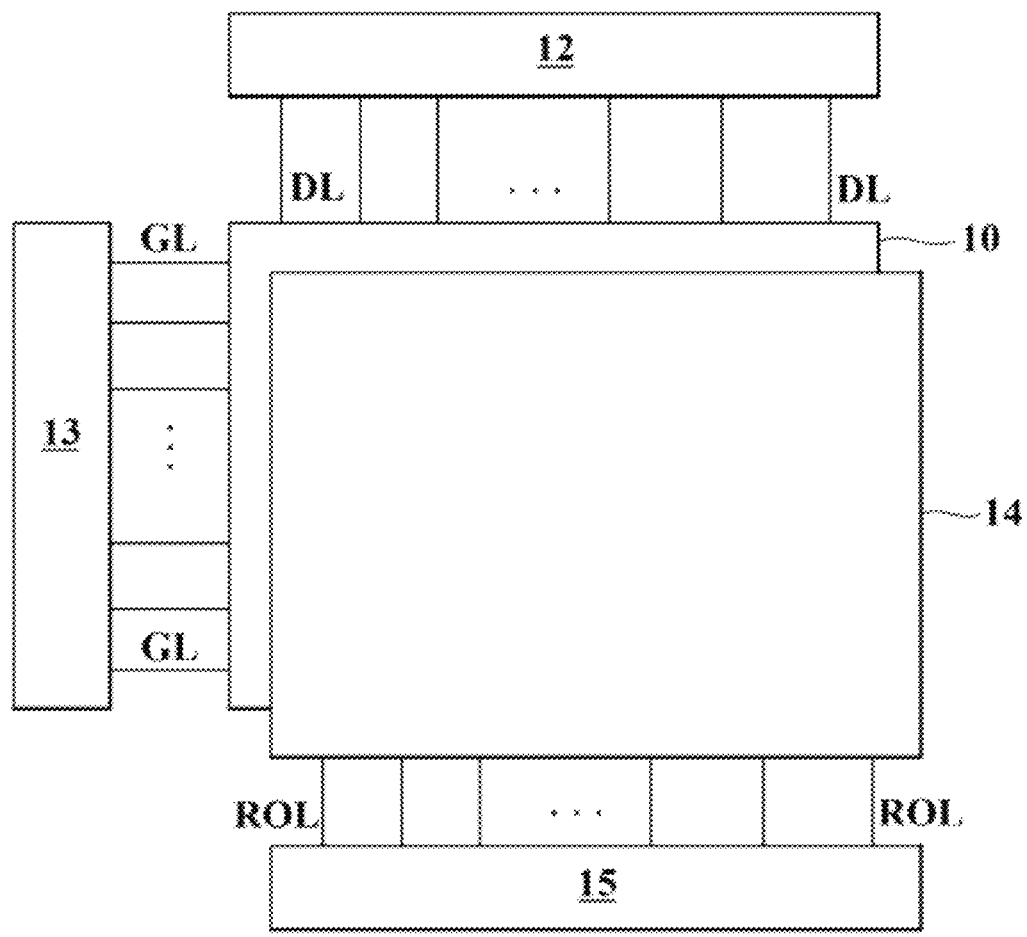
FIG. 2 illustrates a block diagram of a display device having a touch sensor in accordance with a preferred embodiment of the present invention, schematically.

FIG. 2 illustrates a block diagram of a display device having a touch sensor in accordance with a preferred embodiment of the present invention, schematically.

Referring to FIG. 2, the display device having a touch sensor includes a touch sensor array 14, a readout circuit 15, a display panel 10, a data driver 12, and a gate driver 13.

As the display panel 10, a flat display device, such as a liquid crystal display device, a plasma display panel, and an organic luminescence diode display device, can be used, mostly. The display panel 10 will be described taking the liquid crystal display device as an example. If the liquid crystal display device is used as the display device 10, the liquid crystal display device 10 includes a color filter substrate having a color filter array formed thereon, a thin film transistor array substrate having a thin film transistor array formed thereon, a liquid crystal layer between the color filter substrate and the thin film transistor array substrate, and a polarizing plate attached to an outside of each of the color filter substrate and the thin film transistor array substrate. The liquid crystal display device drives the liquid crystal layer with a horizontal electric field or a vertical electric field formed according to an image signal for displaying an image.

The gate driver 13 drives the plurality of gate lines GL formed at the thin film transistor array of the display panel 10, in succession. The gate driver 13 supplies a scan pulse of a gate on voltage to drive the gate lines GL, and a gate off voltage in other periods.

The data driver 12 supplies a data signal to a plurality of data lines DL formed at the thin film transistor array of the display panel 10. The data driver 12 receives and converts a digital data into an analog data signal by using a gamma voltage and supplies the data signal to the data line DL every time the gate line GL is driven.

The touch sensor array 14 includes a plurality of touch sensors (Not shown), and a plurality of readout lines ROL connected to a plurality of touch sensors. The touch sensor array 14 can be attached to the display panel 10 or built in a pixel array of the display panel 10 as one unit with the display panel 10. The readout circuit 15 drives the touch sensor, as well as generates the touch sensing signal which indicates whether a touch is made or not by comparing a signal from the readout lines ROL to a reference voltage, converts the touch sensing signal into a digital data, and forwards the same to a signal processor (Not shown). The readout circuit 15 can be integrated with the signal processor as one touch controller IC (Integrated Circuit). The readout circuit 15 uses a plurality of amplifiers which use, not the related art single reference voltage, but first and second reference voltages different from one another respectively, to set an input voltage range variably, and use a gain capacitor to scale the voltage range. Eventually, the readout circuit 15 can prevent the peak value of the touch signal from overflowing as well as maximize a quantization rate of the touch sensing signal. The readout circuit 15 will be described in detail, later.

Figure 3:
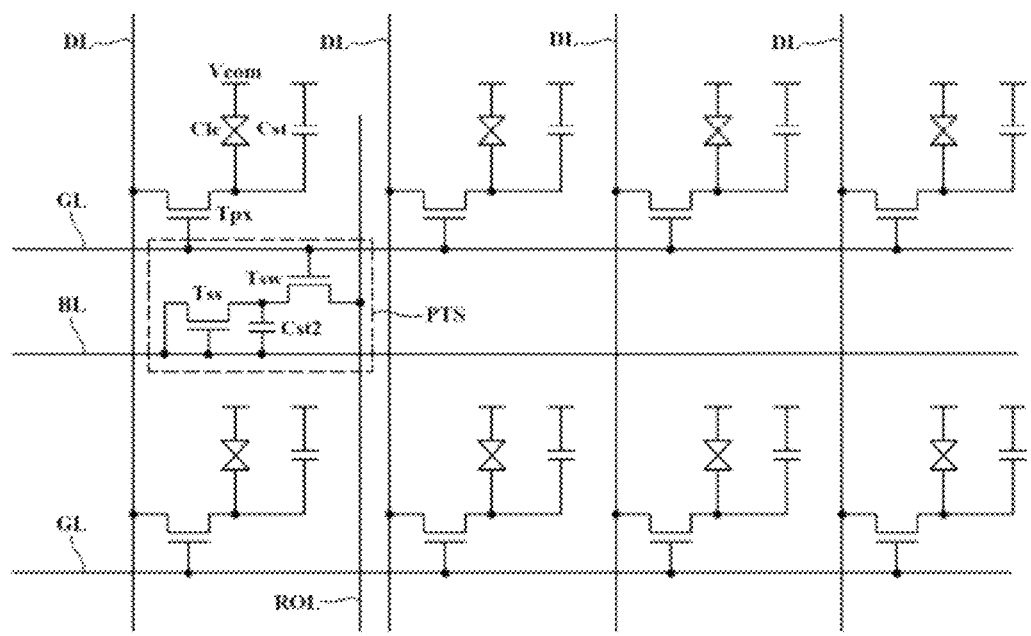
FIG. 3 illustrates an equivalent circuit of a photo-touch sensor as an example of the touch sensor array in FIG. 2.

FIG. 3 illustrates an equivalent circuit of an in-cell type photo-touch sensor as an example of the touch sensor array in FIG. 2.

The photo-touch sensor PTS in FIG. 3 is built in the pixel array of the liquid crystal display device. Each of the pixels PX includes a pixel thin film transistor Tpx formed at each pixel region defined as the gate line GL and the data line DL cross, and a liquid crystal capacitor Clc and a storage capacitor Cst connected to the pixel thin film transistor Tpx in parallel. The liquid crystal capacitor Clc has a pixel electrode connected to the pixel thin film transistor Tpx, a common electrode, and a liquid crystal layer to have a vertical or horizontal electric field applied thereto, which is formed by the pixel electrode and the common electrode. The pixel thin film transistor Tpx stores a data signal from the data line DL in the liquid crystal capacitor Clc and the storage capacitor Cst in response to a gate signal from the gate line GL. The liquid crystals are driven by the data signal stored in the liquid crystal capacitor Clc, and the storage capacitor Cst sustains the data signal in the liquid crystal capacitor Clc.

The photo-touch sensor PTS includes a sensor thin film transistor Tss for sensing the touch according to photo intensity, a bias line BL for supplying a bias voltage to the sensor thin film transistor Tss, a storage capacitor Cst2 for storing a signal from the sensor thin film transistor Tss, a switch thin film transistor Tsw for forwarding a signal stored in the storage capacitor Cst2, and a readout line ROL connected to the switch thin film transistor Tsw.

The sensor thin film transistor Tss has a gate electrode and a first electrode both connected to the bias line BL, and a second electrode connected to the storage capacitor Cst2. The first and second electrodes can be a source electrode and a drain electrode depending on a direction of a current. The storage capacitor Cst2 is connected between the second electrode and the gate electrode of the sensor thin film transistor Tss. The switch thin film transistor Tsw has a gate electrode connected to the gate line GL, and first and second electrodes connected to the storage capacitor Cst2 and the readout line ROL, respectively.

The sensor thin film transistor Tss generates an photo leakage current in response to photo intensity of an incident or reflected light of the touch, and stores the photo leakage current in the storage capacitor Cst2. The switch thin film transistor Tsw forwards a voltage stored in the storage capacitor Cst2 to the readout line ROL in response to the gate signal from the gate line GL. Eventually, the photo-touch sensor PTS forwards a signal indicating whether the touch is made or not to the readout line ROL depending on the photo intensity of the incident or reflected light.

Figure 4:
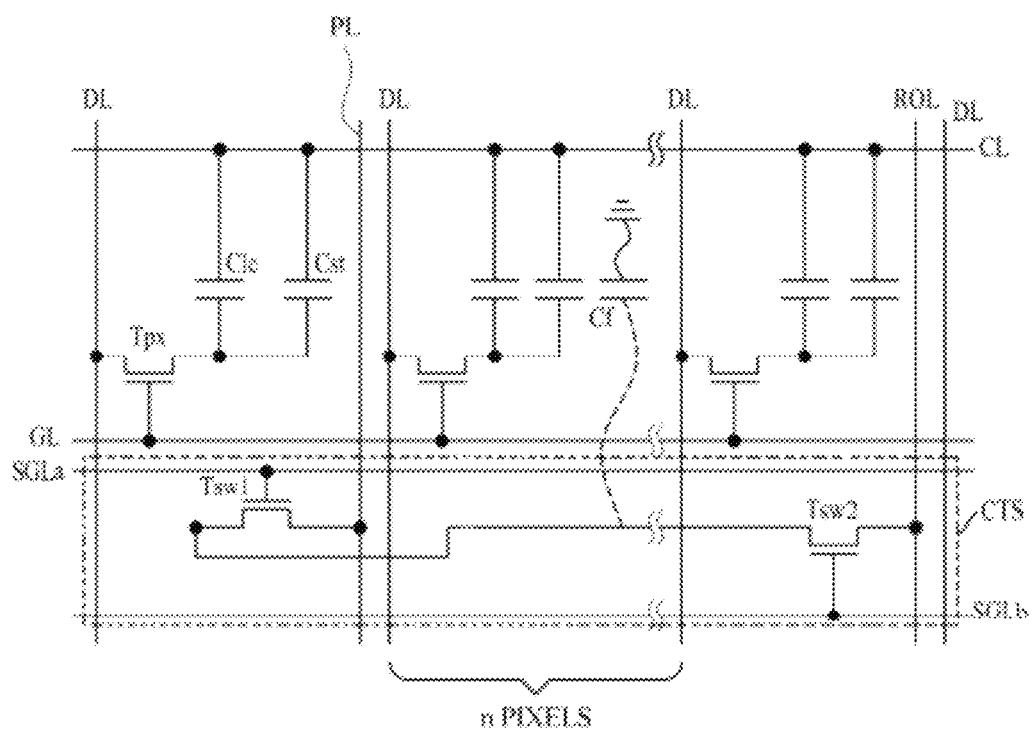
FIG. 4 illustrates an equivalent circuit of a capacitive touch sensor as another example of the touch sensor array in FIG. 2.

FIG. 4 illustrates an equivalent circuit of an in-cell type capacitive touch sensor as an example of the touch sensor array in FIG. 2.

The capacitive touch sensor CTS in FIG. 4 is built in the pixel array of the liquid crystal display device. As described, each of the pixels PX includes a pixel thin film transistor Tpx connected to the gate line GL and the data line DL, and a liquid crystal capacitor Clc and a storage capacitor Cst connected to the pixel thin film transistor Tpx in parallel.

The capacitive touch sensor CTS includes a sensing electrode 20 for forming a sensing capacitor Cf with a touch body, a pair of sensor gate lines SGLa and SGLb, a first switch thin film transistor Tsw1 for forming a current path with a power line PL and one side terminal of the sensing electrode 20 under the control of the first sensor gate line SGLa, and a second switch thin film transistor Tsw2 for forming a current path with a readout line ROL and the other side terminal of the sensing electrode 20 under the control of the second sensor gate line SGLb.

The first switch thin film transistor Tsw1 has a gate electrode connected to the first sensor gate line SGLa, a first electrode connected to the power line PL, a second electrode connected to the one side terminal of the sensing electrode 20. The first and second electrodes become a source electrode and a drain electrode depending on a current direction, respectively. The second switch thin film transistor Tsw2 has a gate electrode connected to the second sensor gate line SGLb, a first electrode connected to the readout line ROL, and a second electrode connected to the other side terminal of the sensing electrode 20.

The first switch thin film transistor Tsw1 supplies a driving voltage Vd from the power line PL to the sensing electrode 20 in response to a gate signal from the first sensor gate line SGLa. In this instance, if the touch body touches a surface of the liquid crystal display device, the sensing capacitor Cf is formed between the touch body and the sensing electrode 20. In succession, the second switch thin film transistor Tsw2 forwards a signal matched to a charge quantity induced at the sensing electrode 20 by the touch capacitor to the readout line ROL in response to the gate signal from the second sensor gate line SGLb.

Not only the photo-touch sensor or the capacitive touch sensor described before, but also different types of touch panel attached to the display panel 10 can be applied to the touch sensor array 14 in FIG. 2.

Figure 5:
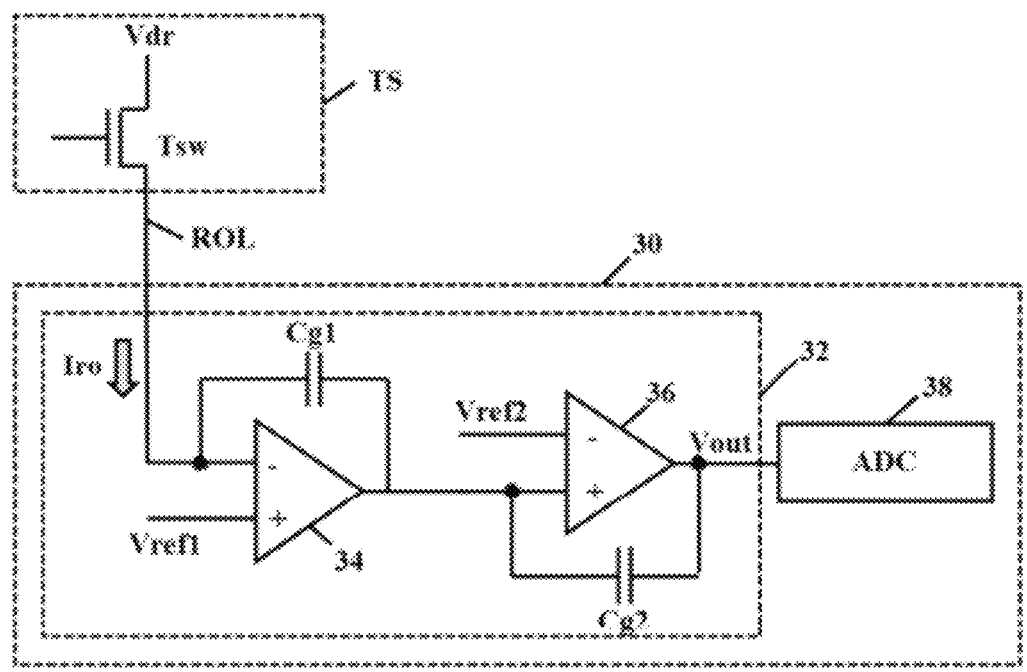
FIG. 5 illustrates an equivalent circuit of a readout circuit for a touch sensor in accordance with a preferred embodiment of the present invention.
Figure 6:
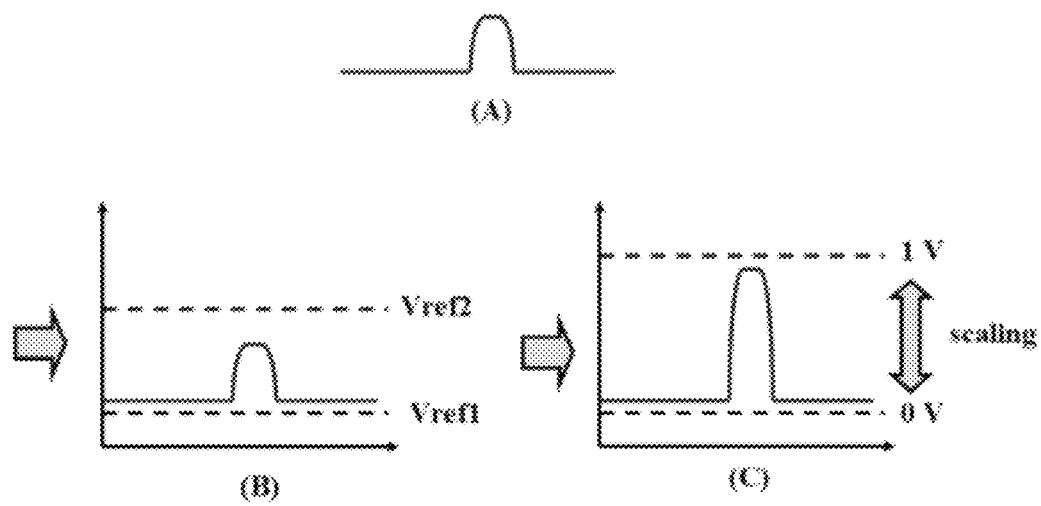
FIG. 6 illustrates a driving wave form of the readout circuit in FIG. 5.

FIG. 5 illustrates an equivalent circuit of a readout circuit for a touch sensor in accordance with a preferred embodiment of the present invention, and FIG. 6 illustrates a driving wave form of the readout circuit in FIG. 5.

Referring to FIG. 5, the readout circuit 30 includes a comparative circuit 32 for limiting and scaling an input range Vref1-Vref2 of a readout signal received through each of the readout lines ROL, to forward the touch sensing signal, and an analog to digital converter ADC 38 for converting the touch sensing signal from the comparative circuit 32 to a digital sensing data, and forwarding the digital sensing data.

The comparative circuit 32 includes first and second amplifiers 34 and 36 connected to the readout line ROL from the touch sensor TS in series to set the input range Vref1-Vref2 of the readout signal, and first and second gain capacitors Cg1 and Cg2 respectively connected to the first and second amplifiers 34 and 36 in parallel to scale the readout signal for forwarding the touch sensing signal Vout suitable for a driving range of the ADC 38.

The readout line ROL connected to the switch thin film transistor Tsw of the touch sensor TS is connected to an inversion (−) input terminal of the first amplifier 34, and the first reference voltage Vref1 input line is connected to a non-inversion (+) input terminal of the first amplifier 34. The first gain capacitor Cg1 is connected between the inversion (−) input terminal and an output terminal of the first amplifier 34 in parallel to the first gain capacitor Cg1. The output terminal of the first amplifier 34 is connected to the non-inversion (+) input terminal of the second amplifier 36 in series, and the second reference voltage Vref2 input line is connected to the inversion (−) input terminal of the second amplifier 36. The second gain capacitor Cg2 is connected between the non-inversion (+) input terminal and the output terminal of the second amplifier 36 in parallel to the second amplifier 36.

Referring to FIG. 6, the readout signal from the touch sensor TS through the readout line ROL is limited to be a voltage higher than the first reference voltage Vref1 by the first amplifier 34 and lower than the second reference voltage Vref2 by the second amplifier 36. And, as shown in FIG. 6, the readout signal between the first and second reference voltages Vref1 and Vref2 is scaled to be the driving range of the ADC 38 by the first and second gain capacitors Cg1 and Cg2 and forwarded as the touch sensing signal Vout. For an example, the touch sensing signal can be scaled to be 1V range and forwarded. According to a voltage range of the readout signal, the first and second reference voltages Vref1 and Vref2 are adjusted, and according to the driving range of the ADC 38, capacitance of the first and second gain capacitors Cg1 and Cg2 are adjusted, respectively.

The touch sensing signal Vout from the second amplifier 36 is determined as the following equation 1.

$$Vout = Vref1 - Vref2 - \frac{\int_{t0}^{t0+Tf} Iro(t)dt}{Cg1} \times \frac{\int_{t0}^{t0+Tf} Iro(t)dt}{Cg2}$$

Where, Vout denotes a voltage of the touch sensing signal from the second amplifier 36, Vref1 denotes the first reference voltage, Vref2 denotes the second reference voltage, Cg1 denotes the first gain capacitor, Cg2 denotes the second gain capacitor, Iro denotes a current of the readout signal supplied from the touch sensor TS through the readout line ROL, and to and Tf denote unit time ranges for integrating the readout current, respectively.

According to this, the comparative circuit 32 varies the first and second reference voltages Vref1 and Vref2 and the capacitance of the first and second parasitic capacitors Cg1 and Cg2 with the peak value of the readout signal from the touch sensor TS to set an input range of the readout signal, as well as scales the readout signal, enabling to forward the touch sensing signal Vout suitable for the driving range of the ADC 38.

As a result of this, while the related art readout circuit having the 1V range fixed by single reference voltage has a problem of overflow if the touch sensing signal is high, the readout circuit of the present invention can prevent the readout signal from overflowing by setting the input range of the readout signal taking the peak value of the readout signal into account with reference to the first and second reference voltages Vref1 and Vref2. Moreover, while the quantization rate of the related art readout circuit having the 1V range fixed by the single reference voltage is fixed as $1V/2^{n-1}$ (Where, n denotes a number of bits of the touch sensing data), by varying the quantization rate of the readout circuit of the present invention as "$1V/2^{n-1} \times$ scale factor" by applying a scale factor from the capacitance of the first and second gain capacitors Cg1 and Cg2, the quantization rate of the touch sensing signal can be maximized.

Figure 7:
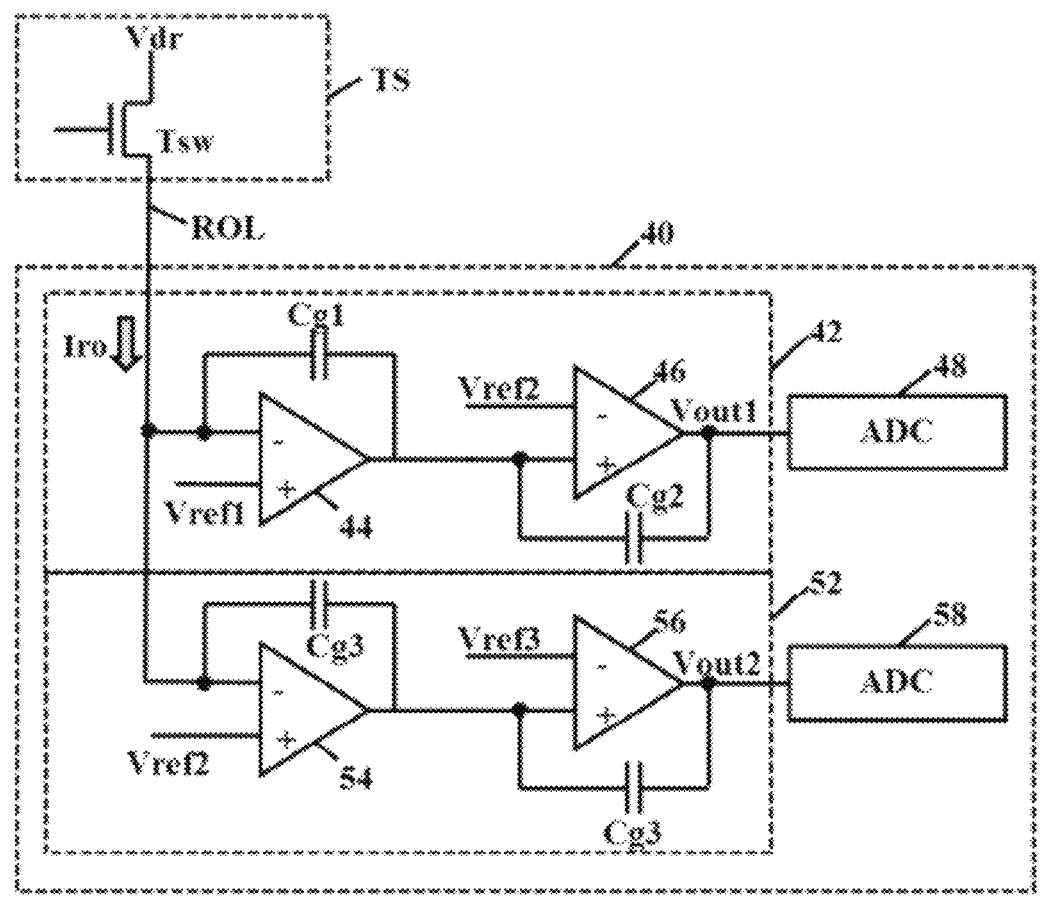
FIG. 7 illustrates an equivalent circuit of a readout circuit for a touch sensor in accordance with another preferred embodiment of the present invention.
Figure 8:
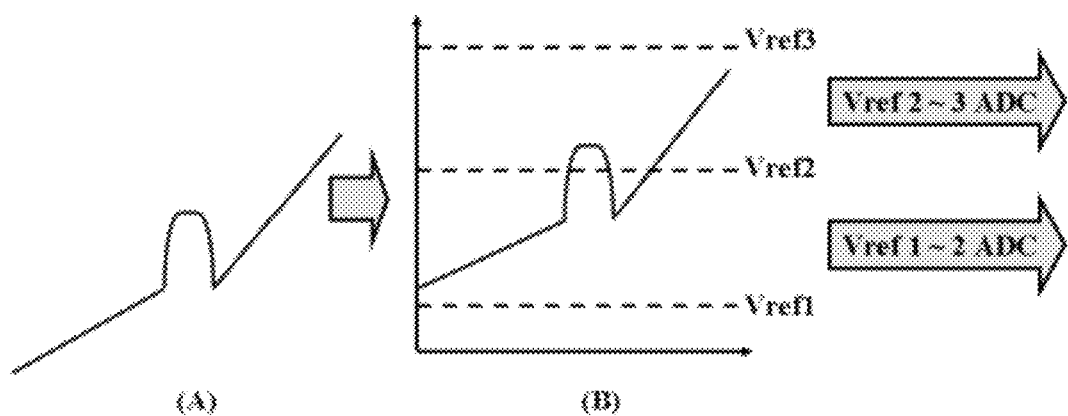
FIG. 8 illustrates a driving wave form of the readout circuit in FIG. 7.

FIG. 7 illustrates an equivalent circuit of a readout circuit for a touch sensor in accordance with another preferred embodiment of the present invention, and FIG. 8 illustrates a driving wave form of the readout circuit in FIG. 7.

In comparison to the readout circuit 30 in FIG. 5, the readout circuit 40 in FIG. 7 is different in that the readout circuit 40 has a plurality of comparative circuits 42 and 52 and a plurality of ADCs 48 and 58 for one readout line ROL while the readout circuit 30 in FIG. 5 has one comparative circuit 32 and one ADC 38 for one readout line ROL.

Referring to FIG. 7, the readout circuit 40 includes a plurality of comparative circuits 42 and 52 for limiting and scaling input ranges of a readout signal received through the readout line ROL from the touch sensor TS to forward the touch sensing signals respectively, and a plurality of ADCs 48 and 58 for converting the touch sensing signals from the comparative circuits 42 and 52 to digital sensing data, and forwarding the digital sensing data, respectively.

The first comparative circuit 42 includes first and second amplifiers 44 and 46 connected to the readout line ROL from the touch sensor TS in series to set a first input range Vref1-Vref2 of the readout signal, and first and second gain capacitors Cg1 and Cg2 respectively connected to the first and second amplifiers 44 and 46 in parallel to scale the readout signal for forwarding a first touch sensing signal Vout1 suitable for a driving range of the ADC 48. The first amplifier 44 has an inversion (−) input terminal connected to the readout line ROL and a non-inversion (+) input terminal connected to an input line of the first reference voltage Vref1. The first gain capacitor Cg1 is connected between an inversion (−) input terminal and an output terminal of the first amplifier 34 in parallel to the first amplifier 34. The second amplifier 46 has a non-inversion (+) input terminal connected to an output terminal of the first amplifier 44 and an inversion (−) input terminal connected to an input line of the second reference voltage Vref2. The second gain capacitor Cg2 is connected between a non-inversion (+) input terminal and an output terminal of the second amplifier 46 in parallel to the second amplifier 46.

The second comparative circuit 52 includes third and fourth amplifiers 54 and 56 connected to the readout line ROL from the touch sensor TS in series to set a second input range Vref2~Vref3 of the readout signal, and third and fourth gain capacitors Cg3 and Cg4 respectively connected to the third and fourth amplifiers 54 and 56 in parallel to scale the readout signal for forwarding a second touch sensing signal Vout2 suitable for a driving range of the second ADC 58. The third amplifier 54 has an inversion (−) input terminal connected to the readout line ROL and a non-inversion (+) input terminal connected to an input line of the second reference voltage Vref2. The third gain capacitor Cg3 is connected between an inversion (−) input terminal and an output terminal of the third amplifier 54 in parallel to the third amplifier 54. The fourth amplifier 56 has a non-inversion (+) input terminal connected to an output terminal of the third amplifier 54 and an inversion (−) input terminal connected to an input line of the third reference voltage Vref3. The fourth gain capacitor Cg4 is connected between a non-inversion (+) input terminal and an output terminal of the fourth amplifier 56 in parallel to the fourth amplifier 56.

Referring to FIG. 8, the readout signal from the touch sensor TS through the readout line ROL can have a base level increasing with time. This is because the parasitic capacitance and resistance of the readout line ROL varies with a position of the in-cell type touch sensor. For an example, as shown in FIG. 8, the greater the parasitic capacitance and the resistance of the readout line ROL, the greater the base level of the readout signal.

Taking a case in which the input voltage range of the readout signal increases thus into account, the first comparative circuit 42 limits an input signal to be higher than the first reference voltage Vref1 by the first amplifier 44 and lower than the second reference voltage Vref2 by the second amplifier 46. According to this, the readout signal limited between the first and second reference voltages Vref1 and Vref2 is scaled to be the driving range of the first ADC 48 by the first and second gain capacitors Cg1 and Cg2 and forwarded as a first touch sensing signal Vout1.

The second comparative circuit 52 limits an input signal to be higher than the second reference voltage Vref2 by the third amplifier 54 and lower than the third reference voltage Vref3 by the fourth amplifier 56. According to this the readout signal limited between the second and third reference voltages Vref2 and Vref3 is scaled to be the driving range of the second ADC 58 by the third and fourth gain capacitors Cg3 and Cg4 and forwarded as a second touch sensing signal Vout2.

The first ADC 48 converts and forwards the first touch sensing signal Vout1 from the first comparative circuit 42 as a first digital sensing signal, and the second ADC 58 converts and forwards the second touch sensing signal Vout2 from the second comparative circuit 52 as a second digital sensing signal. And, the first and second digital sensing signals from the first and second ADCs 48 and 58 are superimposed as a final digital sensing signal.

Eventually, even in a case the input voltage range of the readout signal varies (increases) with variation of characteristics (the parasitic capacitance and the resistance) coming from a position of the readout line ROL, a receivable width of variation of the readout signal can be maximized by sorting the input voltage range of the readout signal into a plurality of voltage ranges Vref1~Vref2, and Vref2~Vref3 and converting the plurality of voltage ranges Vref1~Vref2, and Vref2~Vref3 into a plurality of digital data by using the plurality of comparative circuits 42 and 52 and the plurality of ADCs 48 and 58 connected to each of the readout lines ROL in common.

The first to third reference voltages Vref1~Vref3 are adjusted according to the voltage range of the readout signal individually, capacitance of the first and second gain capacitors Cg1 and Cg2 are adjusted according to the driving range of the first ADC 48, and capacitance of the third and fourth gain capacitors Cg3 and Cg4 are adjusted according to the driving range of the second ADC 58.

As has been described, the readout circuit for a touch sensor of the present invention has the following advantages.

The setting of an input range of the readout signal taking the peak value of the readout signal into account with reference to the plurality of reference voltages permits to prevent the readout signal from overflowing.

And, the varying of the quantization rate of the readout circuit of the present invention as "$1V/2^{n-1} \times$ scale factor" by applying a scale factor from the capacitance of the first and second gain capacitors Cg1 and Cg2, the quantization rate of the touch sensing signal can be maximized.

Even in a case the input voltage range of the readout signal varies (increases) with variation of characteristics (the parasitic capacitance and the resistance) coming from a position of the readout line ROL, a receivable width of variation of the readout signal can be maximized by sorting the input voltage range of the readout signal into a plurality of voltage ranges Vref1~Vref2, and Vref2~Vref3 and converting the plurality of voltage ranges Vref1~Vref2, and Vref2~Vref3 into a plurality of digital data by using the plurality of comparative circuits and the plurality of ADCs connected to each of the readout lines ROL in common.

Eventually, the readout circuit for a touch sensor of the present invention can improve touch sensing sensitivity owing to increased input range of the readout signal and the quantization rate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A readout circuit connected to each of readout lines from a touch sensor, comprising:
    a comparative circuit for setting an input range of a readout signal from the readout line as well as scaling the readout signal to be a required driving range and forwarding the readout signal scaled thus as a touch sensing signal; and
    an analog to digital converter for converting the touch sensing signal from the comparative circuit as a digital sensing signal and forwarding the digital sensing signal,
    wherein the comparative circuit includes:
    a plurality of amplifiers connected to the readout line as one channel in series and inputting respectively a plurality of reference voltages for limiting the input range of the readout signal, wherein the plurality of reference voltages are different each other; and
    a plurality of gain capacitors connected respectively to the plurality of amplifiers and connected each other in series for scaling the readout signal.

2. The readout circuit according to claim 1, wherein the comparative circuit includes:
    first and second amplifiers connected to the readout line in series for limiting an input range of the readout signal to be between a first reference voltage and a second reference voltage; and
    the touch sensor having a first gain capacitor connected between input/output terminals of a first amplifier and a second gain capacitor connected between input/output terminals of a second amplifier, for scaling the readout signal to be a driving range of the analog to digital converter.

3. The readout circuit according to claim 2, wherein the first and second reference voltages are adjusted according to a voltage range of the readout signal, and
    capacitance of the first gain capacitor and capacitance of the second gain capacitor is adjusted according to the driving range of the analog to digital converter.

4. A readout circuit connected to each of readout lines from a touch sensor, comprising:
    a plurality of comparative circuits for setting input ranges of a readout signal from the readout line different from one another as well as scaling the readout signal to be required driving ranges different from one another and forwarding the readout signals scaled thus as a plurality of touch sensing signals, respectively; and
    a plurality of analog to digital converters for converting the touch sensing signals from the plurality of comparative circuits as digital sensing signals and forwarding the digital sensing signals, respectively,
    wherein each of the plurality of comparative circuits includes:
    a plurality of amplifiers connected to the readout line as one channel in series and inputting respectively a plurality of reference voltages for limiting the input range of the readout signal, wherein the plurality of reference voltages are different each other; and
    a plurality of gain capacitors connected respectively to the plurality of amplifiers and connected each other in series for scaling the readout signal.

5. The readout circuit according to claim 4, wherein the plurality of comparative circuits include first and second comparative circuits connected to the readout signal in common, and
    the plurality of analog to digital converters include first and second analog to digital converters connected to the first and second comparative circuits, respectively.

6. The readout circuit according to claim 5, wherein the first comparative circuit includes:
- first and second amplifiers connected to the readout line in series for limiting an input range of the readout signal to be between a first reference voltage and a second reference voltage, and
- a first gain capacitor connected to input/output terminals of the first amplifier and a second gain capacitor connected between input/output terminals of the second amplifier to scale the readout signal to be a driving range of the first analog to digital converter.

7. The readout circuit according to claim 6, wherein the second comparative circuit includes:
- third and fourth amplifiers connected to the readout line in series for limiting the input range of the readout signal to be between the second reference voltage and a third reference voltage, and
- a third gain capacitor connected to input/output terminals of the third amplifier and a fourth gain capacitor connected between input/output terminals of the fourth amplifier to scale the readout signal to be the driving range of the second analog to digital converter.

8. The readout circuit according to claim 5, wherein the first to third reference voltages are adjusted according to a voltage range of the readout signal individually, capacitance of the first gain capacitor and capacitance of the second gain capacitor is adjusted according to the driving range of the first analog to digital converter, and
capacitance of the third gain capacitor and capacitance of the fourth gain capacitor is adjusted according to the driving range of the second analog to digital converter.

9. The readout circuit according to claim 4, wherein the readout circuit superimposes a plurality of touch sensing data forwarded through the plurality of analog to digital converters individually to forward one touch sensing data.

\* \* \* \* \*